United States Patent [19]

Sato

[11] Patent Number: 4,614,863
[45] Date of Patent: Sep. 30, 1986

[54] OPTICAL SIGNAL PROCESSING SYSTEM WITH VARIABLE GAIN STAGE OF SERVO SYSTEM CONTROLLED BY OUTPUT OF ENVIRONMENTAL CONDITION SENSOR

[75] Inventor: Tetsuo Sato, Takasaki, Japan

[73] Assignee: Hitachi, Ltd., Tokyo, Japan

[21] Appl. No.: 650,173

[22] Filed: Sep. 13, 1984

[30] Foreign Application Priority Data

Oct. 31, 1983 [JP] Japan .................................. 58-202596

[51] Int. Cl.[4] .............................................. G01J 1/20
[52] U.S. Cl. ...................................... 250/201; 369/44
[58] Field of Search ................. 250/201 DF; 318/648, 318/651; 369/44, 45, 46

[56] References Cited

U.S. PATENT DOCUMENTS 4,344,165 8/1982 Akiyama .............................. 369/44
4,475,182 10/1984 Hosaka ................................. 369/46

Primary Examiner—David C. Nelms
Assistant Examiner—James G. Gatto
Attorney, Agent, or Firm—Antonelli, Terry & Wands

[57] ABSTRACT

A digital audio disc player is equipped with a tracking-/focus servo mechanism which automatically controls the tracking and focusing of a light beam projected on a disc. The vibration of an automobile or other vehicle containing the player is detected so that, when there is a significant amount of vibration, the control sensitivity of the tracking/focus servo mechanism is increased to prevent the occurrence of tracking and focusing errors.

10 Claims, 11 Drawing Figures

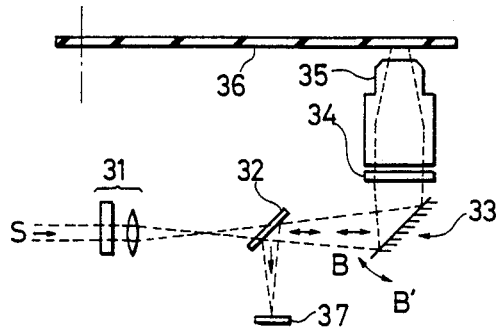
FIG. 5(A)
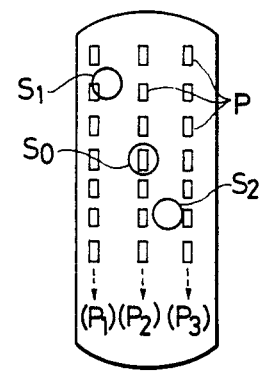
FIG. 5(B)
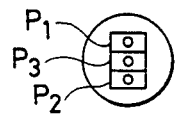
FIG. 5(C)
FIG. 6
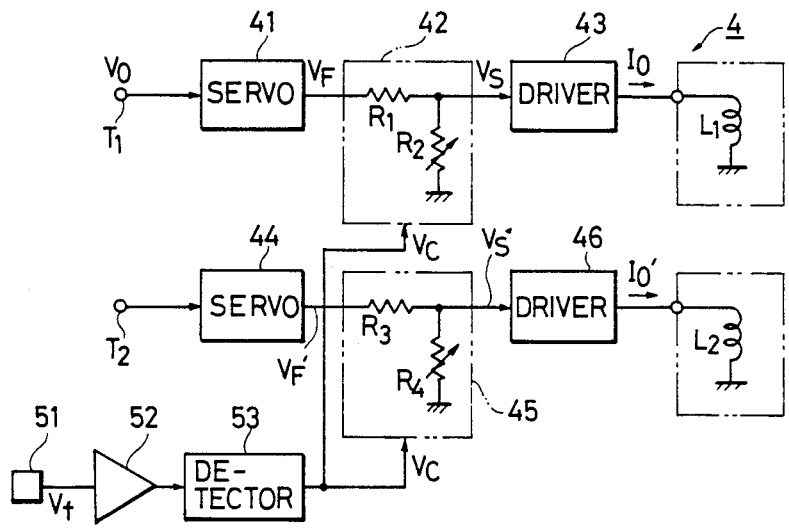

OPTICAL SIGNAL PROCESSING SYSTEM WITH VARIABLE GAIN STAGE OF SERVO SYSTEM CONTROLLED BY OUTPUT OF ENVIRONMENTAL CONDITION SENSOR

BACKGROUND OF THE INVENTION

The present invention relates to an optical signal processing system, and more particularly, to a system that is suitable for use in an optical compact disc player.

A digital audio disc is a medium which can record and play back audio signals, relying upon digital signal processing technology. In addition to optical compact discs, digital audio discs include electrostatic discs (AHD, audio high-density discs), stylus-type minidiscs (MD, minidiscs/microdiscs), and the like.

Of these three types, the optical compact disc will be described below. Digital signals recorded in the form of a sequence of pits are read out from the disc, and are converted into electric signals (audio signals).

The optical compact disc has the following features:
(1) It is designed to have a small size specifically for an audio system, and hence, the player can be made compact as well.
(2) The "pocket size" disc has a diameter of only 12 cm, so that the cost of manufacturing it can be reduced and the cost of storing and distributing it can also be reduced.
(3) It is possible that the system can be developed so that the disc can be used in players in automobiles or outdoors.
(4) Since the pickup is of the noncontact type, the disc has an almost permanent life. Like all reflected-light discs, the signal surface is protected with a 1.2 mm thick layer of plastic, so that the signals are hardly affected by any dust or scratches on the surface of the disc.

The inventor has conducted extensive studies on the mounting of optical compact disc players in cars (vehicles) as mentioned in (3) above, and has discovered that there are still the following problems therewith. Optical signal processing systems as represented by optical compact disc players are extremely sensitive to vibrations. When an optical compact disc player is mounted in a vehicle (such as a car), errors in the setting of the light relative to the turntable increase because of the vibration of the car while it is running. The inventor has further discovered that focus deviations (focus errors) and tracking deviations (tracking errors) increase because of mechanical fluctuations, such as vibration or eccentricity.

SUMMARY OF THE INVENTION

The object of the present invention is to provide an optical signal processing system which can be mounted in various vehicles, such as an automobile, and which is equipped with a highly accurate servo system that is capable of preventing the occurrence of focus or tracking errors due to the vibration of the automobile.

The object of the present invention is accomplished by detecting any change in the environment in which the digital audio disc player is installed, e.g., by detecting vibration, noise, etc., and controlling the gains of the focus servo system and the tracking servo system in response to the detection signals to counter any change in the environment, thereby preventing the occurrence of focus and tracking errors and preventing the audio signals from being affected by noise generated by the servo systems.

BRIEF DESCRIPTION OF THE DRAWINGS

The above and other objects as well as novel features of the invention will become obvious from the following detailed description when taken in conjunction with the accompanying drawings.

FIGS. 5(A), 5(B) and 5 (C) are perspective views of an example of the optical system which provides the tracking servo operation;

FIG. 6 is a block diagram of the circuit construction of a focus and tracking servo system to which the present invention is applied.

PREFERRED EMBODIMENT OF THE INVENTION

Figure 1:
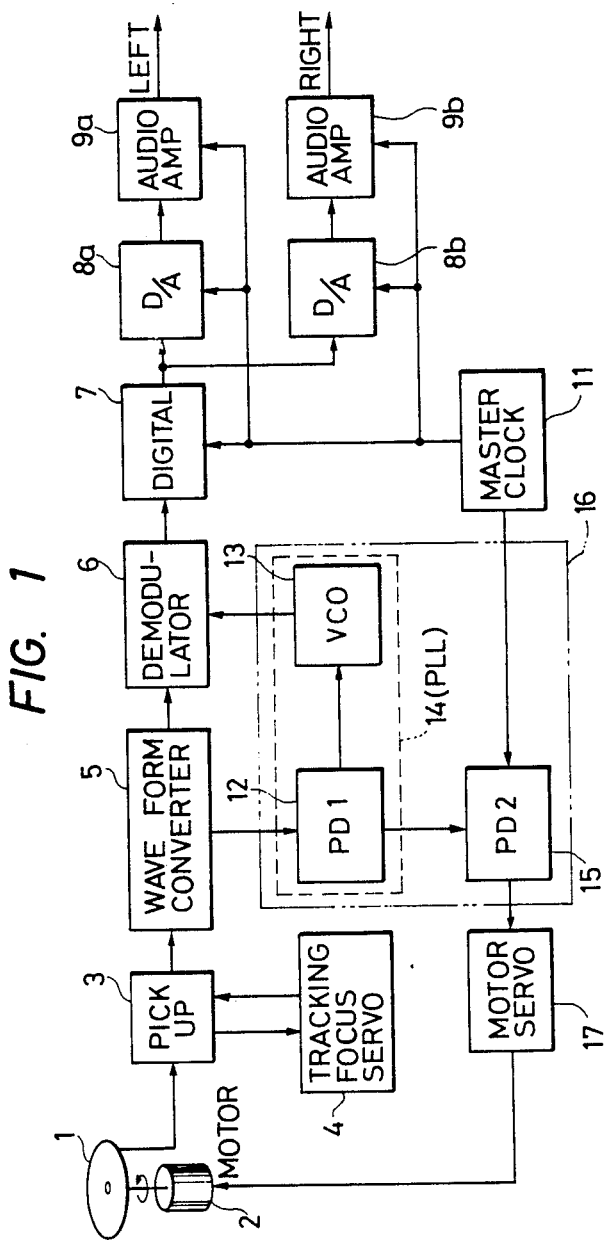
FIG. 1 is a block diagram of a compact disc player according to an embodiment of the present invention.

A digital audio disc player according to an embodiment of the present invention will now be described with reference to the drawings. The digital audio disc player as shown in FIG. 1 has been designed to play back an optical compact disc. Most of the units thereof have been constructed in the form of semiconductor integrated circuits except for the turntable 1 for rotating the compact disc, the electric motor 2, and the pickup 3.

In FIG. 1, light is shone on a compact disc supported on the turntable 1, and the light reflected therefrom or transmitted therethrough is detected. Electric signals detected by the pickup 3 are supplied to a tracking focus servo circuit 4 to which the present invention is applied, as well as to a waveform shaper 5. The tracking focus servo circuit 4 will be described later in detail with reference to FIG. 6.

The waveform shaper 5, a demodulator 6, a digital signal processing unit 7, D-A converters 8a, 8b, and audio amplifiers 9a, 9b are provided to obtain audio playback signals for the left and right channels from the detected signals.

A master clock generator 11 generates clock signals for controlling the playback of the audio signals and the speed of the motor 2. A phase detector 12 and a voltage-controlled oscillator 13 constitute a PLL (phase-locked loop) circuit 14 which provides signals of the frequency required for the demodulation operation from digital signals whose waveforms have been shaped. The PLL circuit 14 and a phase detector 15 constitute a clock regeneration circuit 16. The phase detector 15 compares the relative phase of signals output by the phase detector 12, using a signal output from the master clock generator 11 as a reference. An output signal based on the phase difference between the two signals is supplied as a control signal to a motor servo circuit 17, to control the motor-driving current obtained from the motor servo circuit 17 and the running speed of the motor 2.

Figure 2:
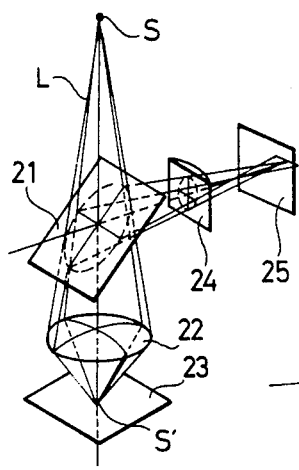
FIG. 2 is a perspective view of the optical system for controlling the focus.

The focus servo and tracking servo operations will now be described. The focus servo operation is necessary because, if viewed microscopically, the surface of the disc is not completely flat, but it can be considered to move up and down with the rotation of the disc. Usually, the objective lens which is part of the pickup 3 has a focal depth of about ±2 μm, so it is necessary to adjust the focus on the surface of the disc to an accuracy of ±2 μm. This is why a focus servo operation is performed. Focus errors can be detected by an astigmatic method, as shown in FIG. 2, a skew beam method, a knife-edge method, or a critical angle method. This embodiment uses the astigmatic method.

It is necessary to control the tracking servo operation, on the other hand, so that the light beam automatically follows the signal track, since a compact disc has no guiding groove. Therefore, both focus and tracking servo operations are essential to proper operation of the system. Tracking errors can be detected by a three-spots method, as shown in FIG. 5, a wobbling method, or a push-pull method. This embodiment uses the three-spots method.

Figure 3:
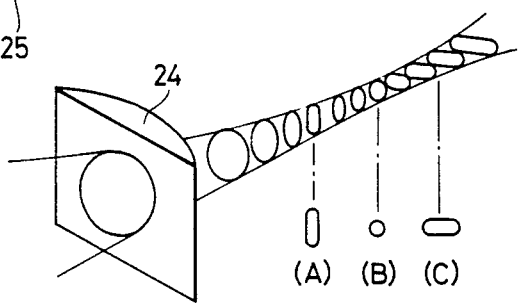
FIG. 3 is a perspective view of the optical system for detecting focus errors.

The method of detecting focus errors will be described below in conjunction with FIGS. 2 to 4. A laser beam L generated from a light source S in FIG. 2 passes through a beam splitter 21, is collected by an objective lens 22, and is focused at S' on a disc 23. The laser beam reflected back by the disc 23 is then reflected in a direction at right angles by the beam splitter 21, and passes through a cylindrical lens 24. If the distance between the objective lens 22 and the disc 23 changes, the shape of the beam projected toward a light-receiving portion 25, consisting of photodiodes or the like, undergoes a change as shown in FIG. 3 and FIGS. 4(A), 4(B), and 4(C). Namely, the beam which has passed through the cylindrical lens 24 can have an oval shape which is elongated vertically (FIG. 3(A)), or a circular shape (FIG. 3(B)), or an oval shape which is enlongated laterally (FIG. 3(C)).

Figure 4A:
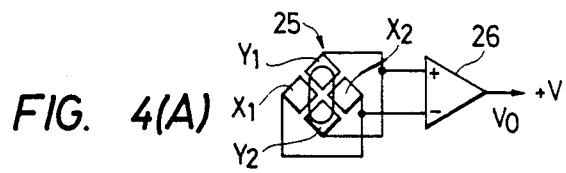
FIGS. 4(A), 4(B) and 4(C) are circuit diagrams of a light-receiving portion, illustrating the operation of detecting focus errors.
Figure 4B:
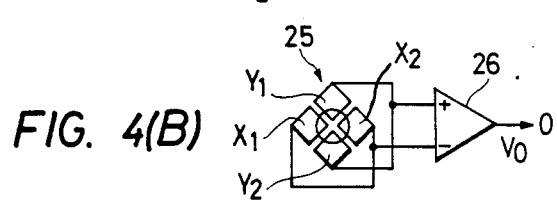
Figure 4C:
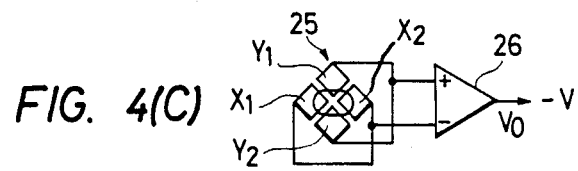

The light-receiving portion 25 is divided into four segments, as shown in FIGS. 4(A), 4(B) and 4(C). If the objective lens 22 and the disc 23 are temporarily too close, the quantity of light shining on light-receiving elements $Y_1$, $Y_2$ is increased, and that shining on light-receiving elements $X_1$, $X_2$ is decreased, as shown in FIG. 4(A). The resultant difference in irradiation quantity is converted into a voltage difference by the light-receiving elements $X_1$, $X_2$, $Y_1$, $Y_2$, and the voltage difference is then amplified by a differential amplifier 26. An output voltage $V_0$ therefrom has a positive polarity, and the voltage level thereof acts as a signal for detecting errors in the spacing between the objective lens 22 and the disc 23.

When the disc 23 is predetermined distance away from the objective lens 22 and the focal point S' is correctly adjusted, the light shining on the light-receiving elements $X_1$, $X_2$, $Y_1$, $Y_2$ is virtually evenly distributed, as shown in FIG. 4(B). The voltage $V_0$ output from the differential amplifier 26 is zero.

When the disc 23 is too far from the objective lens 22, the quantity of light shining on the light-receiving elements $X_1$, $X_2$ is increased, and that shining on the light-receiving elements $Y_1$, $Y_2$ is decreased, as shown in FIG. 4(C). The voltage $V_0$ output from the differential amplifier 26 has a negative polarity, and the level thereof acts as a signal for detecting errors between the objective lens 22 and the disc 23.

The method of detecting tracking errors will be described with reference to FIG. 5. The beam generated from the light source S passes through a diffraction grating 31 and a beam splitter 32, and is then reflected by a tracking mirror 33 in a direction at right angles to the disc 36. The beam then passes through a quarter-wave plate 34 and an objective lens 35, and is focused on the disc 36.

FIG. 5(B) shows the signal surface formed on the disc 36, a number of pits P are formed thereon, corresponding to digital signals. When a central line of pits $P_2$ is being tracked, the beam tracks as indicated by dotted lines $P_1$, $P_2$ and $P_3$ in FIG. 5(B). Reflected light is obtained from an auxiliary beam spot $S_1$, a main beam spot $S_0$, and another auxiliary beam spot $S_2$ that are generated by the light source S. The reflected light passes through the objective lens 35 and the quarter-wave plate 34 of FIG. 5(A), is reflected by the tracking mirror 33 and the beam splitter 32, and is received by a light sensor 37.

The light sensor 37 is divided into three sensor elements $P_1$, $P_0$, $P_2$ corresponding to the beam spots $S_1$, $S_0$, $S_2$, as shown in FIG. 5(C). When the disc surface of FIG. 5(B) is being tracked, if only half the main expected quantity of light from the beam spot $S_0$ is reflected back because its position has deviated, the voltage output by the light sensor $P_0$ decreases, and thus a tracking deviation is detected. At the same time, a high-level output signal corresponding to tracking deviation is detected from one of the light sensors $P_1$ and $P_2$ that correspond to the auxiliary beam spots $S_1$ and $S_2$.

Focus tracking errors are thus detected by the operation of the circuits described above. The focus and tracking servo operations are performed according to detection signals therefrom. The present invention makes it possible to perform these servo operations with a very high accuracy. The servo operations of the optical signal processing system according to the present invention will be described below in conjunction with FIG. 6.

An input terminal $T_1$ is supplied with the output signal $V_0$ from the differential amplifier 26 of FIG. 4. Reference numeral 41 denotes a servo circuit which supplies an output signal $V_F$ to a variable gain circuit 42 which controls gain according to the voltage level of a control voltage $V_C$ obtained from a detector circuit 53. A resistor $R_1$ and a variable resistor $R_2$ are shown in the diagram to illustrate the operational effects of the circuit.

The gain of the variable gain circuit 42 is controlled by detecting any change in speed of an automobile or by detecting noise in the surroundings. A detector 51 could be a speedometer, a tachometer, or a microphone. If a speedometer is used as the detector, the frequency of the output signals $V_f$ increases as the automobile accelerates.

Reference numeral 52 denotes a preamplifier, and a detector circuit 53 generates a control voltage $V_C$ whose level varies with changes in frequency. As the automobile accelerates and the control voltage $V_C$ reaches a high level, the resistor $R_2$ is controlled so that the variable gain circuit 42 generates a large gain. Accordingly, an output signal $V_S$ from the variable gain circuit 42 reaches a high level, and an increased current $I_0$ flows from a drive circuit 43 to a coil $L_1$.

Figure 7:
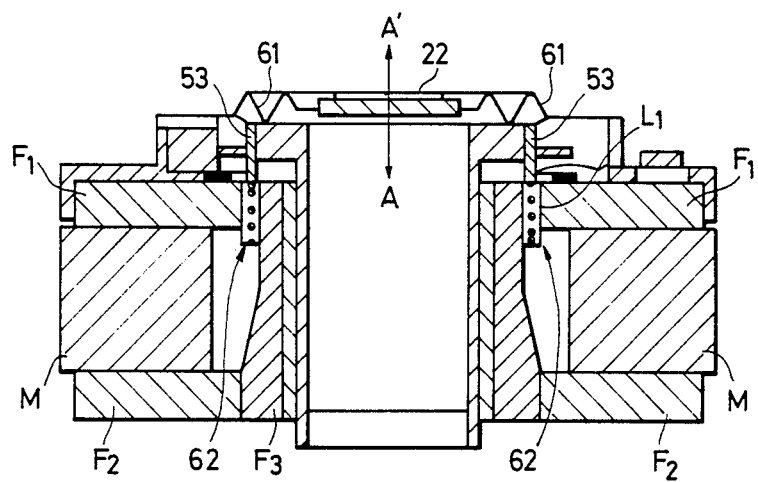
FIG. 7 is a section through a focal distance control mechanism which provides the focus servo operation.

The coil $L_1$ corresponds to a coil $L_1$ in a focal distance control mechanism, such as shown in FIG. 7, which performs the focus servo operation. The coil $L_1$ is arranged so that it moves up and down in a direction A—A' within a gap 62, and is connected to the objective lens 22 by a connection plate 53 and a damper 61, so that the lens 22 moves up and down in synchronism with the up-and-down movement of the coil $L_1$. The magnetic flux generated by an annular permanent magnet M passes through the gap 62 along a magnetic path constituted by disc-shaped magnetic path-forming members (such as steel members) $F_1$, $F_2$, and a cylindrical member $F_3$. When a current $I_0$ flows through the coil $L_1$, it receives a force due to the linkage of the magnetic flux and the electric current $I_0$ according to Fleming's left-hand rule, so that the objective lens 22 moves up or down in the direction A—A', together with the coil $L_1$, to adjust the focal point S'.

When the automobile accelerates, a high-gain condition is established from the input terminal $T_1$ to the coil $L_1$, that is, the open-loop gain of the servo system increases, and the servo capability increases. Therefore, when a focusing error due to acceleration caused by vibration or due to noise has developed, feedback is applied immediately, and a focus servo operation is performed very accurately without being affected by noise generated in the servo system.

The tracking servo operation will now be described. An input terminal $T_2$ of FIG. 6 is connected to receive output voltages from the light sensors $P_0$, $P_1$ and $P_2$ of FIG. 5. Reference numeral 44 denotes a servo circuit, an output signal $V_F'$ therefrom is supplied to a variable gain circuit 45. The variable gain circuit 45 operates in the same manner in response to the control voltage $V_C$, as the variable gain circuit 42. An output signal $V_S'$ therefrom is supplied to a drive circuit 46, and an electric current $I_0'$ flowing through a coil $L_2$ is controlled, according to the voltage level of the output signal $V_S'$.

In this embodiment, the angle of inclination of the tracking mirror 33 of FIG. 5(A) is turned in the direction of arrows B—B' according to the intensity of the electric current $I_0'$ flowing through the coil $L_2$. This angle of inclination changes the angle by which the light from the light source S is reflected, so that the tracking positions indicated by the broken lines in FIG. 5(B) are controlled, and the beam is projected to meet the pit positions as required.

The circuits operate as described above so that, in the tracking servo system, a high-gain condition is established from the input terminal $T_2$ to the coil $L_2$ when the automobile accelerates, and a tracking servo operation is performed very accurately without any interference due to noise resulting from external vibrations, etc.

When the automobile decelerates, the level of the control voltage $V_C$ decreases in either the focus or the tracking servo operation, and the gains of the variable gain circuits 42, 42' decrease. Therefore, when the surroundings are quiet, such as during low-speed running, the gains of the servo systems are controlled accordingly, and noise generated by mechanically vibrating portions of the servo systems is kept below an audible level.

If the gains of the focus and tracking servo systems are increased when the vehicle is generating a small degree of vibration, the servo function performs sensitively, even for slight errors caused by distorted disc surface, scratches, specks, and fluctuations in motor speed, so that noise appears in the output generated by playing back the compact disc. According to the present invention, however, the gains of the servo systems are kept small under conditions in which vibrations are small, so that the generation of noise is prevented.

When the vehicle generates a large degree of vibration, the focus and tracking servo systems output increased gains, so that the generation of focusing and tracking errors can be prevented very efficiently. In this case, noise could appear in the output reproduced from the compact disc, or noise generated by mechanically vibrating portions of the servo systems could be amplified to an audible level. Under these conditions, however, the vehicle is generating so much vibration that this covers the noise generated by the servo systems. A significant feature of the present invention is that it provides a sophisticatedly selected relationship between environmental noise and the desired vibration-proof performance.

This embodiment provides the following advantages.

(1) The gains of the focus tracking servo systems are controlled according to changes in the environmental conditions surrounding the digital audio disc player, so that the servo systems operate very accurately.

(2) According to the present invention, the gains of the focus and tracking servo systems are kept low when the vehicle containing the optical compact disc player is generating a small degree of vibration. Therefore, noise due to a distorted disc surface or fluctuations in the speed of the motor is not amplified to an audible level.

When a large degree of vibration is generated, the gains of the servo systems are increased to increase the servo ability. However, noise due to a distorted disc surface of fluctuations in the speed of the motor is covered by environmental noise and is not distinguishable. This means that unwanted noise does not annoy anyone listening to the music, etc., from the disc.

The present invention has been described above by way of a specific embodiment. The invention, however, should in no way be limited to this embodiment alone, but can be modified in a variety of ways within a range that does not depart from the gist of the invention.

In this embodiment, for instance, the control voltage $V_C$ corresponding to the acceleration of the automobile is obtained by a speedometer. It is, however, possible to use a microphone instead. In this case, the increase in engine noise accompanying the acceleration of the automobile is detected, and the gains of the servo systems are controlled to obtain the same effects.

The foregoing description has chiefly dealt with the case in which the present invention is adapted to a digital audio disc player mounted on a car, which acts as a background to the present invention. The invention, however, should not necessarily be limited thereto. For instance, the invention can be adapted to an optical disc file memory which can provide reading and writing data using a semiconductor laser device as a light source.

By employing the present invention, furthermore, the digital audio disc player need not be limited to being mounted in a car, but it can also be installed in a variety of transportation means such as ships, aircraft, etc.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. An optical signal processing system, comprising:
   (a) a light source for projecting light onto the surface of a recording medium on which data is recorded;

(b) control means for controlling the focusing and position of said light on the surface of said recording medium; and (c) signal generator means for generating signals proportional to an environmental condition which is likely to cause vibration of said recording medium and for applying said signals to said control means to control the sensitivity of the operation of said control means.

2. The optical signal processing system according to claim 1, further comprising:

(d) pickup means for detecting light from said recording medium to convert said data recorded on the surface of said recording medium into electric signals; and (e) signal processing means for converting said electric signals produced by said pickup means into playback signals.

3. The optical signal processing system according to claim 2, wherein said data recorded on the surface of said recording medium is digital data, and said signal processing means includes a digital signal processing unit and a D-A converter.

4. The optical signal processing system according to claim 3, wherein said control means comprises means which uses feedback to perform a servo control operation for controlling the focusing and positioning of light projected onto the surface of said recording medium, so that when said environmental vibration is large, said signals obtained from said signal generator means act to increase the control sensitivity of said servo control operation.

5. The optical signal processing system according to claim 4, wherein said signal generator means comprise means for detecting the vibration of a vehicle in which said optical signal processing system may be mounted.

6. An optical signal processing system for reproducing data recorded on a recording medium under an environmental condition where said recording medium may be subjected to vibrations, comprising:

reproducing means for reproducing said data recorded on said recording medium by projecting a beam of light onto said recording medium and detecting the light received from the recording medium to produce an electrical signal corresponding to said recorded data, including means for controlling the focusing and position of said light beam on the surface of said recording medium using a servo control operation;

means for detecting said environmental condition which may subject the recording medium to vibration and for generating a detecting signal in response thereto; and means for applying said detecting signal of said reproducing means to control the sensitivity of said servo control operation of said focusing and position controlling means.

7. An optical signal processing system according to claim 6, wherein said detecting means comprises means for detecting the speed of a vehicle in which the optical signal processing system may be mounted and for generating a detecting signal in response thereto.

8. An optical signal processing system according to claim 6, wherein said detecting means comprises a microphone.

9. An optical signal processing system according to claim 6, wherein said detecting means comprises vibration detector means for detecting vibration of a vehicle in which said optical signal processing system may be mounted.

10. An optical signal processing system according to claim 6, wherein said data recorded on said recording medium is digital data, and wherein said reproducing means includes a digital signal processing unit and a D-A converter.

* * * * *